United States Patent
Long

(10) Patent No.: US 7,347,762 B1
(45) Date of Patent: Mar. 25, 2008

(54) TURKEY CALLS

(76) Inventor: Kenneth W. Long, P.O. Box 71, El Dorado Springs, MO (US) 64744

( * ) Notice: Subject to any disclaimer, the term of this patent is extended or adjusted under 35 U.S.C. 154(b) by 300 days.

(21) Appl. No.: 11/198,217

(22) Filed: Aug. 5, 2005

Related U.S. Application Data

(60) Provisional application No. 60/599,525, filed on Aug. 6, 2004.

(51) Int. Cl.
*A63H 5/00* (2006.01)
(52) U.S. Cl. ................................. 446/418; 446/397
(58) Field of Classification Search ................ 446/397, 446/418
See application file for complete search history.

(56) References Cited

U.S. PATENT DOCUMENTS

| | | | | |
|---|---|---|---|---|
| 2,511,403 A | * | 6/1950 | Fleener | 446/397 |
| 4,527,985 A | | 7/1985 | Zoschg et al. | 446/397 |
| 4,798,556 A | | 1/1989 | Vicars et al. | 446/391 |
| 4,941,858 A | | 7/1990 | Adams | 446/391 |
| 5,380,235 A | | 1/1995 | Forbes et al. | 446/397 |
| 5,484,319 A | * | 1/1996 | Battey | 446/397 |
| D393,810 S | | 4/1998 | Richardson | D10/119 |
| 5,830,036 A | * | 11/1998 | Richardson | 446/397 |
| 5,846,119 A | | 12/1998 | Long | 446/397 |
| 6,149,493 A | | 11/2000 | Long | 446/397 |
| 6,168,493 B1 | | 1/2001 | Kirby | 446/418 |

* cited by examiner

*Primary Examiner*—Eugene Kim
*Assistant Examiner*—Urszula M Cegielnik
(74) *Attorney, Agent, or Firm*—Jonathan A. Bay

(57) ABSTRACT

A box-type turkey call has not only a pin that pivotally interconnects the call's base to the call's paddle-like actuator but also a fastener that allows endless disconnection and re-connection of the actuator-to-base connection. That way, the actuator can be rolled over a half a roll to present the opposite broad side thereof for production of calls. The actuator's handle is bored through with a lock hole, which allows insertion of a locking fastener through it that is then tightened into a socket therefor in the call base. This optionally locks the turkey call from squawking when not wanted. Moreover, the call actuator can be disconnected from the original end of the call base and re-connected to the opposite end by virtue of the socket for the locking fastener. Hence, the call actuator can be operatively connected to either end of the call base.

19 Claims, 7 Drawing Sheets

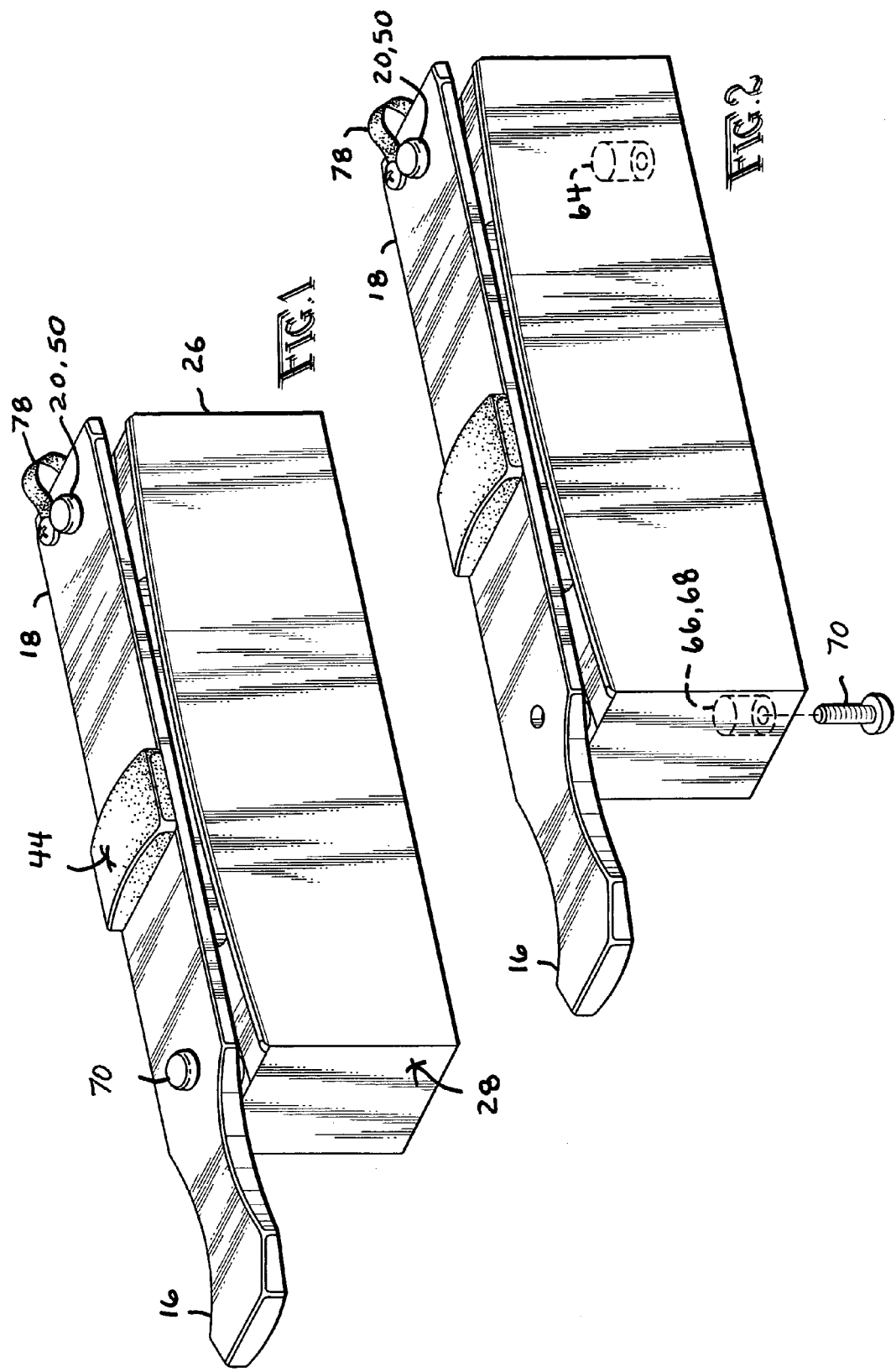

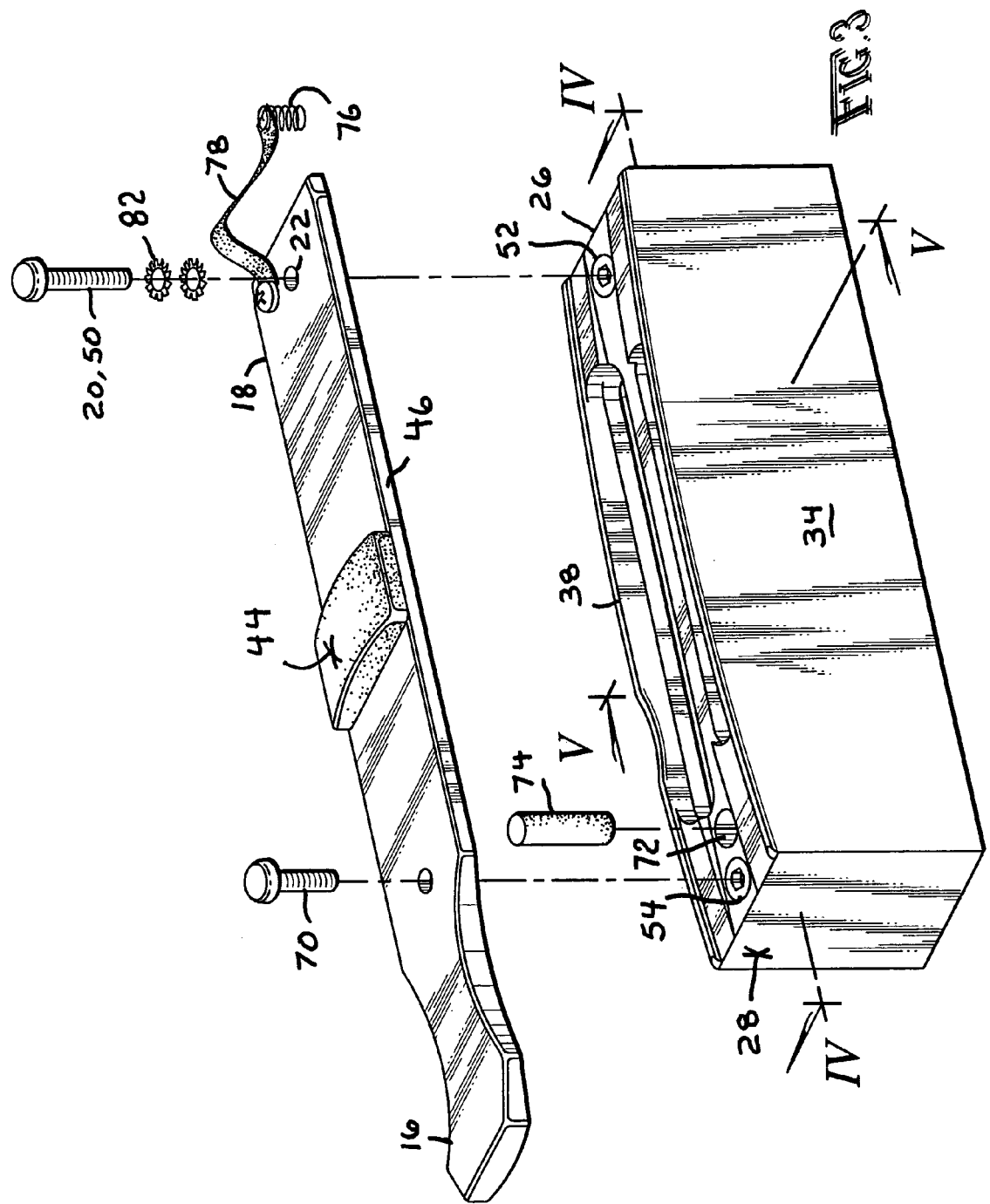

US 7,347,762 B1

TURKEY CALLS

CROSS-REFERENCE TO PROVISIONAL APPLICATION(S)

This application claims the benefit of U.S. Provisional Application No. 60/599,525, filed Aug. 6, 2004, the disclosure of which is incorporated herein by this reference.

BACKGROUND AND SUMMARY OF THE INVENTION

The invention relates to turkey calls and, more particularly, to box-type turkey calls and a variety of inventive enhancements for what to date have been conventional models.

It is an object of the invention to overcome the problem of a box-type turkey call packed for a jostling hike through the woods or fields squawking on its own at a really inopportune time, and hence scaring turkeys rather than interesting them, by locking down the call actuator (eg., the lid and not the box) for transport.

It is another object of the invention to provide the foregoing locking feature by a locking fastener.

It is an alternate object of the invention to provide the call base (eg., the box and not the lid) with a reserve threaded socket on the bottom wall as a place to store the locking fastener when not in use.

By way of background, there is a compression spring that has the pivot pin inserted through it and disposed between the call base (eg., the box and not the lid) and call actuator (eg., the lid and not the box) in order to keep a moderate upward pressure on the call actuator and hence keep the call actuator it from flopping.

Also, one way to check the upward spacing of the call actuator away from the call base is by providing a pivot pin with an enlarged head, which stops the upward travel of the call actuator.

Thus, given the preceding, it is still another object of the invention to provide adjustability over the spacing between the call base and actuator by making the pivot pin a threaded fastener such that twisting or untwisting the fastener dials in a given spacing.

Also, it is a further object of the invention to tether the compression spring with a short lanyard so that it is not lost during times when the spring is taken off the pivot pin, as for example when a use wants the highest possible key or frequencies for the call, which is obtained by tightening the call actuator down very close to the call base (ie., if left in place, the spring would occupy some room on the pivot pin and thus prevent the call actuator from being tightened down a last little bit).

It is still yet another object of the invention to fasten the call actuator to the call base in ways which allow the call actuator to be rolled over a half of a roll along its long axis so that either broad face of the call actuator can be used for sound production by an improved mechanism.

It is still an additional object of the invention to fasten the call actuator to the call base in ways which allow the call actuator to be switched from being pivoted from one end of the call base to the other end for more comfortable use by either right-handed users or left-handed users.

It is still a further object of the invention to provide the outboard sound panels of the call base with purfling (eg., edgewise grooves) inside the sound chamber(s), instead of (if any) on the outside like conventional box calls, because it has been inventively discovered that this interior purfling makes the tones deeper and richer.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings, FIG. 1 is a perspective view of a box-type turkey call in accordance with the invention;

FIG. 2 is a perspective view comparable to FIG. 1 except showing the actuator's locking bolt moving from a locking position to a storage position;

FIG. 3 is an exploded perspective view of FIG. 1;

FIG. 4 is a partial sectional view taken along line IV-IV in FIG. 3;

DETAILED DESCRIPTION OF THE PREFERRED EMBODIMENTS

Figure 7:
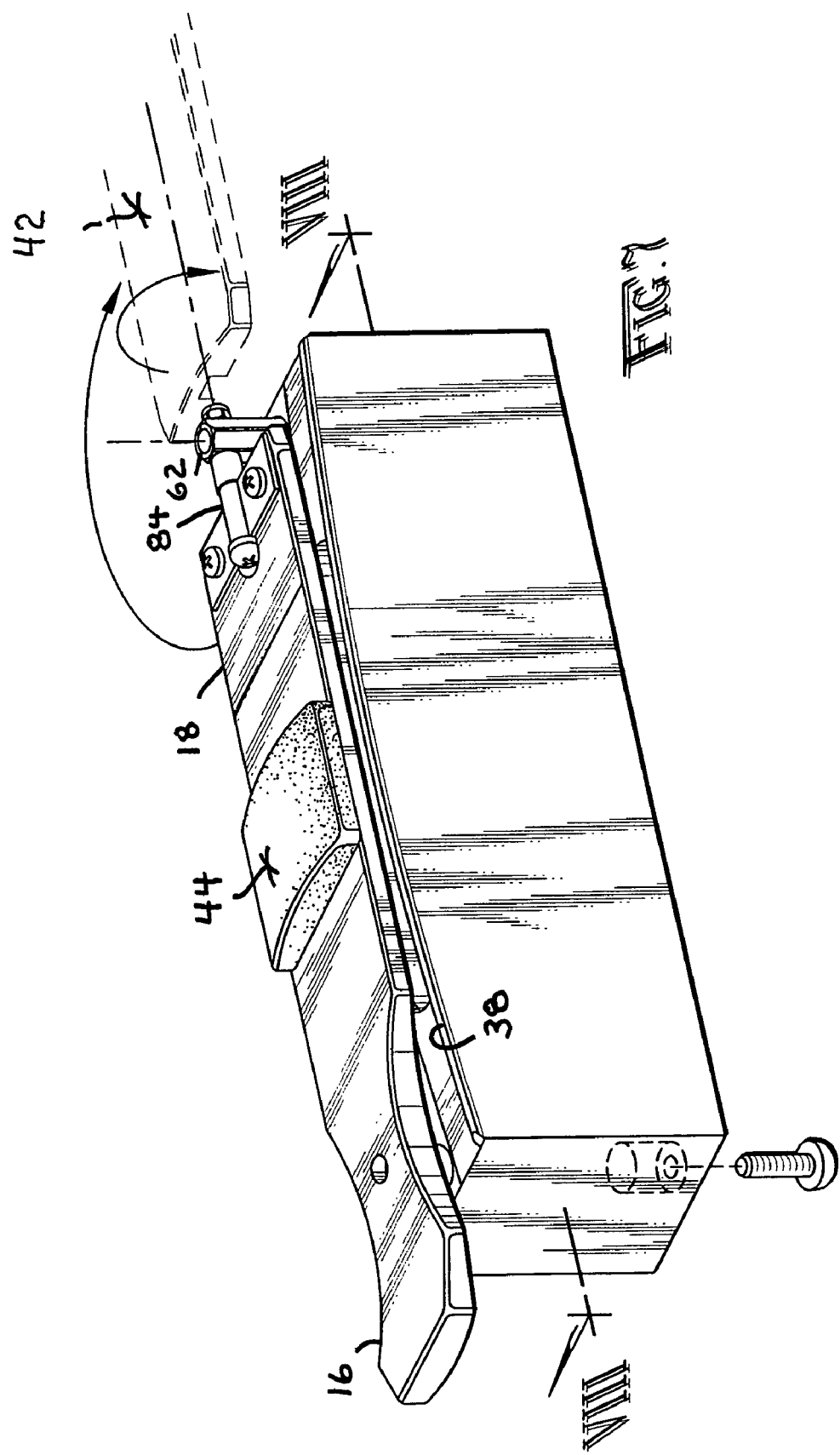
FIG. 7 is a perspective view of an alternate embodiment of a box-type turkey call in accordance with the invention.

FIGS. 1 and 7 show alternative embodiments of box-type turkey calls in accordance with the invention. Each of the these two embodiments share several common structural components.

That is, each has elongated call base (eg., the box and not the lid) and an elongated call actuator (eg., the lid and not the box). The call actuator extends between a handle end 16 and a pivot end 18. In a general sense, the call base and call actuator are coupled together by a pivot pin 20 inserted through a hole 22 therefor in the pivot end 18 of the call actuator.

To digress briefly on a matter of terminology, the call actuator is movable/manipulable in multiple ways relative the call base. The three basic ways are pivot, roll and slant (eg., corresponding to yaw-roll-pitch for aircraft). So, given the orientation of the call base in FIG. 1, it sits upright such that the pivot axis which the pivot pin 20 defines is aligned on a vertical pivot axis. Of course in use, the pivot axis will seldom be truly vertical. But in FIG. 1, the pivot axis is vertical. For convenience in this description, the terms "pivoting" or "sweeping in arcs" are reserved for describing the call actuator being swept back and forth around the axis of the pivot pin 20. "Roll" and "rolling" is reserved for the rolling over of the call actuator about its longitudinal axis. "Slant" or "tip" describes the relative angle or movement in a plane that symmetrically (or nearly so) bisects the call base (eg., which in the drawings is a vertical plane that contains the center partition wall of the call base). Hence the call actuator might set at a "slant" relative the call base so that the handle end 16 is further from or closer to call base than the pivot end 18. To say the call actuator has a "level slant" refers call actuator's handle and pivot ends 16 and 18 being about the same distance away from the call base, eg., as when the call base and call actuator are uniformly spaced apart from or parallel to each other (see, eg., FIG. 4).

Returning to the drawings, the call base has a bottom wall 24 extending between longitudinally-spaced first and second end walls 26 and 28. The bottom and end walls 24, 26 and 28 cooperatively support a pair of outboard sound panels 34 which flank an intermediate partition, all which cooperatively define a pair of open-topped sound chambers 36. Each sound panel 34 has an upper rubbing edge 38 for sound production of mimic turkey calls. Preferably the upper rubbing edges 38 are formed with an arch having an intermediate crest situated between flanking downslopes.

The elongated call actuator presents pair of broad scraping faces 42 and 44 that extend in a lateral direction between diminutive side edges. The pivot connection between the call actuator and call base allows user to scrape the DOWN broad face of the call actuator (eg., down as oriented in the drawings) in back or forth strokes over either sound panel's rubbing edge for sound production of mimic turkey calls.

Now to digress briefly on terminology for sound values, the term pitch is used sparingly in this description for describing a sound value. What is ordinarily referred to as the "pitch" of a sound might be replaced with calling the same value the "key" of a sound (eg., the discerned but not always the true lowest frequency of a sound, and as more particularly described below in connection with purfling and FIG. 5). It suffices for now to distinguish "tone" from "key." "Tone" is the quality of sound that makes it distinctive other than "key" or "volume." It is to be noted that further on, the term "pitch" has another meaning, and it being in the context not of yaw and roll but of fasteners, namely the threads per inch of a bolt or nut and the like.

Accordingly, the activity of sweeping a scraping face 42 or 44 across a rubbing edge 38 is comparable in ways to the bowing of a violin string. That is, when a scraping face 42/44 is placed on a rubbing edge 38 and then pivoted thereacross, the rubbing edge 38 sticks to the scraping face 42/44, which pulls the rubbing edge 38 aside until the sound panel 34's elastic restoring force produced by its deflection becomes large enough to break the rubbing edge 38 loose from the scraping face 42/44. The rubbing edge 38 now swings rapidly back after having slipped free, damped as it swings by sliding friction against the scraping face 42/44. At the end of the backswing the rubbing edge 38 will come to rest momentarily but is once again caught by the sticking friction of the scraping face 42/44, and recommences being pulled in the direction of the scraping surface 42/44, to begin anew a repeat cycle of the oscillation.

As an aside, users of box-type turkey call usually (almost always) sweep (or stroke) the rubbing edge 38 with call actuator in one direction. Applicant, for example, almost without exception, strokes inward. However, the preceding paragraph describes that, despite the call actuator making only one pass over the rubbing edge 38, there are multiple cycles of stick-and-release between the rubbing edge 38 and call actuator with that one pass.

FIGS. 1 through 6 more particularly show the first embodiment of a turkey call in accordance with the invention. The pivot system between the call actuator and call base not only makes the connection between the two but also affords a disconnection between the two. The pivot system includes the following aspects. The call actuator's pivot end 18 is formed, as mentioned before, with a hole 22 that passes through both broad faces 42 and 44 thereof for the pivot pin 20 (and so, a pivot hole). The pivot pin 20 not only inserts through the pivot hole 22 but also it has external-thread formations over at least a part of it. The call base's first end 26 is formed with a stationary provision for firmly holding the pivot pin 20 in an upright disposition. There is furthermore some manner of a threaded fastening component for securing the call actuator in a pivotally-connected relationship with the call base and, in reverse, for allowing the call actuator to be disconnected from the call base.

In the FIGS. 1-6 version of the turkey call, the aforementioned pivot pin 20 and threaded fastening component can be fulfilled in combination by the sole provision of a pivot bolt 50 at the same time as the aforementioned stationary provision is fulfilled by the call base's first end being formed with an internally-threaded socket 52.

Figure 8:
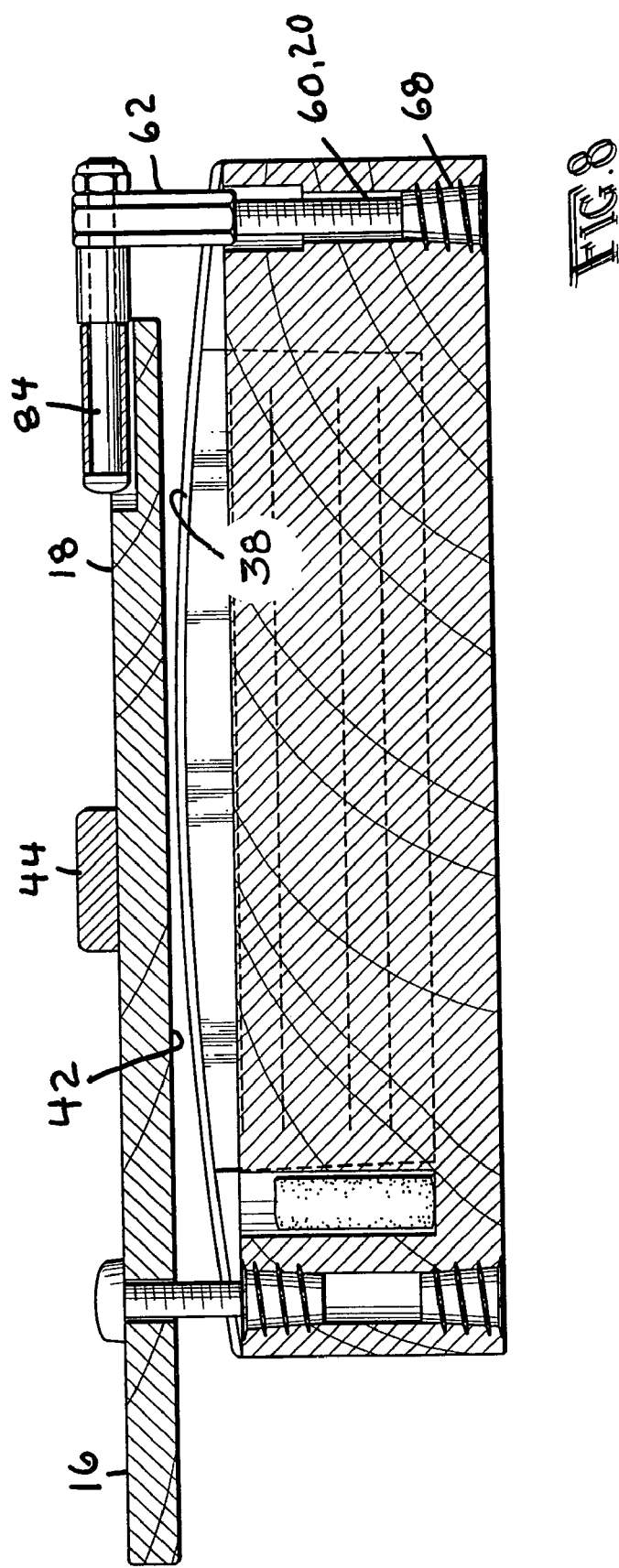
FIG. 8 is a partial sectional view taken along line VII-VII in FIG. 7.

Comparable utility, however, can be achieved by rearranging things as shown in FIGS. 7 and 8 and as follows. That is, the aforementioned pivot pin 20 and stationary provision can be fulfilled in combination by the sole provision of a threaded stud 60 anchored in the call base, and the aforementioned threaded fastening component can be fulfilled by a nut 62.

Returning to FIGS. 1-6, they show that the bolt 50 fulfils the role of pivot pin 20. The internally-threaded socket 52 in the call base accepts the pivot bolt 50 being twisted in to and out of it. As better shown by FIG. 6, it is an aspect of the invention that the call actuator can be disconnected from the call base, rolled over a half a turn, and then re-connected with the call base such that the other broad face 44 is presented for scraping with either rubbing edge 38. Preferably the broad faces 42 and 44 present respectively different scraping materials. For example, the face 42 that is UP in FIG. 6 might be bare wood. Conversely, the face 44 that is UP in FIG. 1 might present a slate slab. The purpose of providing a composite actuator two different kinds of scraping materials includes that, each material thereof has a characteristically different stick-slip friction dynamic associated with it. Trials show that comparing use of each material—as by rubbing one and then the other of the scraping materials on the same rubbing edge 38, with substantially the same applied contact pressure and at substantially the same speed—nevertheless finds that each scraping material can offer a substantially distinct key from the other. The distinctiveness can be changed by selection of diverse materials. Example materials experimented with have included walnut, slate, oak, sassafras and various plastics.

It is another aspect of the invention that the call base is formed with another internally-threaded socket 54 in the top of the second end 28 thereof such that the pivot bolt 50 and call actuator can be taken apart from call base's first end 26, swung about and reattached to the call base's second end 28 by the pivot bolt 50 being twisted into the other internally-threaded socket 54. That way, the call actuator can be pivotally connected to the call base's second end 28 for sound production of mimic turkey calls as well as from the call base's first end 26 (connection to the second end is not shown). Accordingly, the call actuator can be interchangeably attached to either end 26 or 28 of the call base for operative pivoting use. This is convenience allows users regardless of whether left-handed or right-handed to orient the call actuator for a mode of orientation which best suits them on either rubbing edge 38.

It is still another aspect of the invention that the call base's bottom wall 24 is formed with a reserve internally-threaded socket 64 and into the first end wall 26. This reserve socket provides 64 for temporary storage of the pivot bolt 50 when disconnecting the call actuator from the call base in order to provide storage for and reduce chances of the mishandling as well as loss of the pivot bolt 50. It is typical that users will be performing this operation in an overgrown field or woods, even in a tree stand. To drop the pivot bolt 50 in tall grass or leaf litter is a good way to lose it. Hence the reserve socket 64 provides insurance of storing the pivot bolt 50 temporarily while users might fumble with the disconnected call base and call actuator.

Since the call base's second end wall 28 is provided with a top-side threaded socket 54 just as the first end wall 26, another aspect of the invention is as follows. That is, the invention includes the provision of a locking bolt 70. The call actuator's handle end 16 is bored through with a lock hole, which allows the through-passage of the locking bolt 70 that then can be tightened in the socket 54 in the second end wall 28 of the call base. Tightening the locking bolt 70 on the handle end 16 of the call actuator in combination with the retention action of the pivot bolt 50 on the pivot end 18 of the call actuator readily secures the call actuator against the call base. The preceding effectively silences the call during non-use. Hence, unwanted sound production is avoided while hiking and the like. Surely no one wants a turkey call "squawking" from the backpack while jostling through the woods before sunrise to a tree stand. Such is certain to frighten turkeys away rather than interest them.

Moreover, the call base's bottom wall 24 is formed with a second reserve-socket 66 that extends into the second end wall 28 for temporary storage of the locking bolt 70 when the call actuator is unlocked from the call base. Just like for the pivot bolt 50, the second reserve-socket 66 provides storage for and reduces chances of mishandling as well as loss of the locking bolt 70.

There are ample times when both reserve (eg., bottom-side) sockets 64 and 66 would come into play, as when disconnecting and re-connecting the actuator-to-base connection. Both reserve (eg., bottom-side) sockets 64 and 66 would be utilized for this maneuver as for temporarily holding both the pivot and locking bolts 50 and 70.

Figure 4:
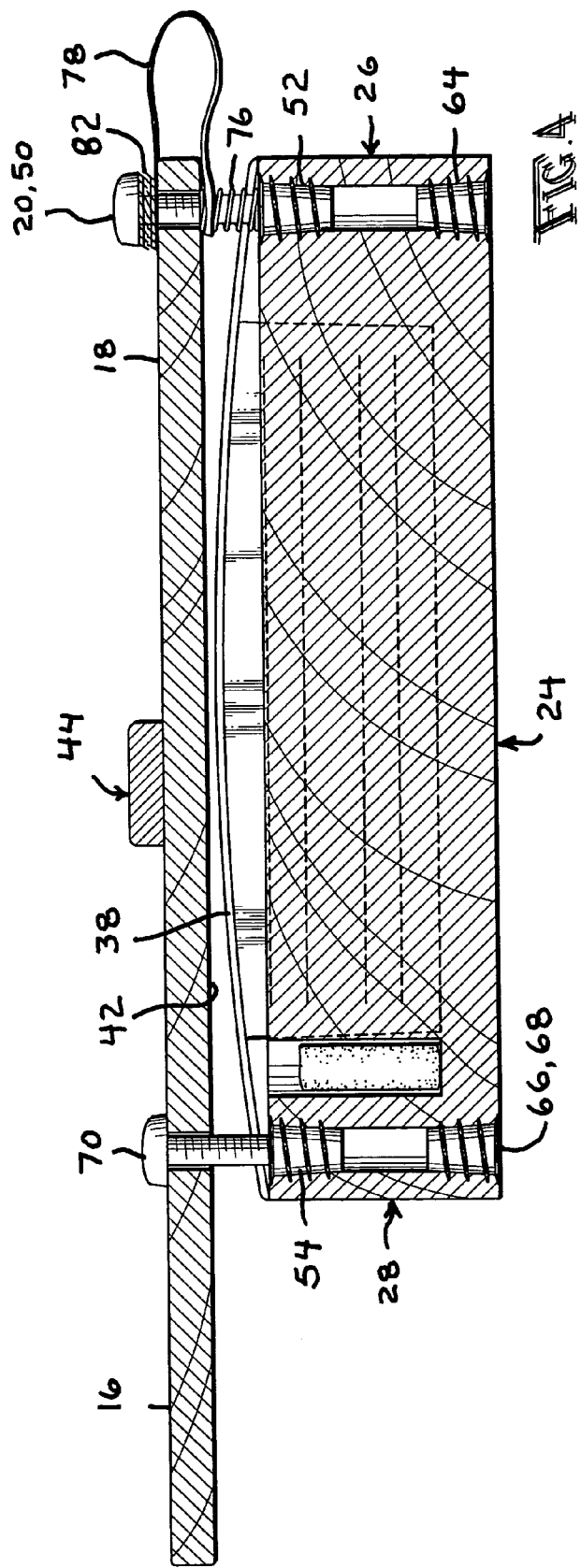
FIG. 4 is a section view taken along line IV-IV in FIG. 3.

FIG. 4 better shows the following aspects of the invention. The call base is bored all the through in two places, once through the first end wall 26 and again through the second end wall 28. Generally the call base is a soft material such as wood or plastic and so on. Each open end of the two holes is outfitted with its own nut insert 68. Since there are four openings for the two through holes, there are accordingly four nut inserts 68. Accordingly, each of the four above-referenced sockets 52, 54, 64 and 66 is equipped with such a nut insert 68. As an aside, if the call base were produced out of plastic, the threads for each socket 52, 54, 64 and 66 could be formed directly into the plastic, and so the nut inserts could be dispensed with.

Nevertheless, for wooden call bases, the nut inserts 68 are preferred, and these are commonly in furniture construction. Each nut insert 68 has a tapered outside formed with coarse self-tapping screw thread. As FIG. 3 better shows, the top ends of the nut inserts 68 are formed with shallow hex sockets for driving by a hex wrench. Hence the nut inserts 68 are driven tight into the call base and are meant to stay in place more or less permanently. Conversely, the pivot and locking bolts 50 and 70 (which thread into the nut inserts 68) are meant to be twisted in and out over many times in the life of the turkey call. The applicant prefers to put a plastic-headed metal bolt known as a furniture leg bolt in service as the pivot and locking bolts 50 and 70. That is, the threaded shank is metal but the enlarged head is a plastic cap more or less permanently attached. Since the head is relatively enlarged, and has a roughened periphery to enhance grip, these factors allow a user to get a relatively-good pinch-hold on the head as well as gives the user a mechanical advantage for the twisting and untwisting operations. That way, all the work with the pivot and locking bolts 50 and 70 can be done in the fields and woods by hand and without tools.

Although not shown in the drawings, the nut inserts 68 have a center bore that is formed with internal thread. The hex sockets in the wide ends of the nut inserts 68 are not only shallow but sufficiently over-sized to allow clearance of the threads of the pivot or locking bolts 50 or 70 when inserted therethrough. In addition to the foregoing, there is also a socket 72 for a chalk stick 74 that is slightly inboard of top-side reserve-socket 64 sunk in the second end wall 28.

As the drawings show, a compression spring 76 is utilized. The compression spring 76 is slid up the pivot bolt 50 between the call actuator and call base to apply an expansion force therebetween. During the operation where the call actuator is switched from being pivoted to the call base's first end wall 26 and socket 52 to the second end wall 28 and socket 54 (or conversely), obviously the spring 76 will have to be slid off the pivot bolt 50. For this purpose, the invention includes a short lanyard 78 for tethering the spring 76 to either the call base (not shown) or the call actuator (shown) in order to prevent mishandling and loss of the spring 76.

In actual practice, there are several reasons the spring 76 will be slid off the pivot bolt 50. Two reasons include rolling the call actuator over a half a roll as well as switching between which of the two end walls 26 and 28 of the call base that is utilized for establishing the pivot connection by means of the pivot bolt 50. A further reason has to do with how a user tunes the call to the highest possible key. That is, the user tightens the pivot bolt 50 down so that the call actuator is slanted up and then so that the contact on the rubbing edge 38 takes place closest to the pivot bolt 50. However, the spring 76 takes up some room on the pivot bolt 50 and thus prevents the call actuator from being tightened down that last little bit. Accordingly, the short lanyard 78 secures the spring 76 to the call actuator to retain the spring 76 when it is removed from the pivot bolt 50, as when temporarily displacing it for tuning the turkey call to its highest possible keys. The lanyard 78 thereby safely protects the spring 76 from dropping to the ground where it can very likely disappear in tall vegetation or leaf litter and the like in fields or woods.

As an aside, the lowest key of a box-type turkey call is when the call actuator scrapes the crest of the rubbing edge 38. As the pivot bolt 50 is tightened down or loosened apart, the call actuator scrapes the rubbing edge on either side of the crest, or that is on one of the downslopes. The downslopes are both shorter in height and closer to an end wall 26 or 28 and hence this like noting a guitar or, more accurately, pressing a guitar string a fret, which causes the string to emit a higher key sound.

Further purposes for the compression spring 76 included maintenance of a set spacing between the call base and call actuator at the pivot bolt 50. This spacing is checked by the enlarged head of the pivot bolt 50. As stated above, preferably the upper rubbing edges 38 are formed as arches which have an intermediate crest situated between flanking downslopes. Accordingly, the key of the turkey call in accordance with the invention is variably adjustable by twisting or untwisting the pivot bolt 50 to change the forced spacing between the call actuator and call base. This spacing in turn governs where on the rubbing edge 38's arch that the call actuator is targeted to rub. These adjustable positions of "where" on the rubbing edge this contact occurs varies between extremes on the arch of closest to the call actuator's pivot end 18 to closest to the call actuator's handle end 16. In the middle between the extremes should be the level slant for the call actuator which, as shown for example in FIG. 4, should have the call actuator scraping the very crest of the rubbing edge 38.

Additional aspects of the invention include the usage of one or more a star-type lock washers 82. The star-type lock washers 82 are slid up the pivot bolt 50 to its head so as to be situated between the pivot bolt 50's enlarged head and the call actuator. The purpose behind the star-type lock washers 82 is to promote, in conjunction with the applied expansion force of the compression spring 76, coupling between the pivot bolt 50 and call actuator. That way, the pivot bolt 50 and call actuator ideally will pivot in union. Given that the pivot bolt 50 and nut inserts 68 of either top-side sockets (eg., 52 or 54) are sized to thread closely with each other, then such twisting and untwisting of the pivot bolt 50 requires that some measure of frictional drag must be overcome to initiate and maintain movement. Hence the frictional drag between the pivot bolt 50 and nut insert 68 is transmitted to the call actuator by virtue of the coupling between the pivot bolt 50 and call actuator provided by the star-type lock washers 82. Consequently, this fortuitously reduces loose flopping with call actuator, and the risk of inadvertent sloppy handling resulting in a mistaken squawk.

In other words, the two intermeshed star-type lock washers 82 on the pivot bolt 50 prevent the call actuator sweeping about wildly clockwise or counter-clockwise as there is some traction between the call actuator and pivot bolt 50, which itself is subject to drag. In addition, the slant angle for the call actuator that is dialed in by twisting the pivot bolt 50 high or low is also held better because of the drag that holds the pivot bolt 50. It is preferred to use two intermeshed star-type lock washers 82 rather than a single one. It is observed that, for these type of washers 82, on one side thereof the star points terminate in burrs, which are better for gaining traction on the pivot bolt 50-s head as well as on the call actuator. By using two star-type lock washers with their burr sides turned out (and smoother sides meshed), improved traction is therefore gotten on both the call actuator and pivot bolt 50's head. The call actuator is typically produced of soft materials like wood or plastic. As stated above, applicant prefers a plastic-headed bolt known as a furniture leg bolt in service as the pivot bolt 50, and in that same passage above various reasons were given for this preference. Here, a further reason includes the following. A star-type lock washer (eg., 82) gains better traction on a plastic bolt head in contrast to metal one.

Pause can be taken now to turn to FIGS. 7 and 8. They show an alternative embodiment of the invention which includes the following distinguishing aspects. One such aspect is that the pivot utility is fulfilled by a pivoting and rolling mechanism. This mechanism comprises an upright threaded stud 60 anchored in the call base's first end wall, an elongated splice nut 62 twisted part way onto the threaded stud 60, and an elongated axle 84 coupled to and projected to trail from call actuator's pivot end 18.

The upright threaded stud 60 is more particularly a threaded rod threaded into a nut insert 68 in the bottom of the call base. The stud/threaded rod 60 and nut insert 68 are more or less permanently joined by brazing or thread-locking adhesive and the like. The splice nut 62 solely determines the pivoting of the call actuator, and as by being twisted or untwisted on the stud 60. The elongated axle 84 solely determines the rolling of the call actuator. Moreover, the elongated axle 84 is connected to the splice nut 62 such they both must pivot in union. Accordingly, the call actuator serves as a crank lever to crank the splice nut 62 around in relative twisting or untwisting sweeps about the stud 60.

Given the foregoing, the call actuator can be pivoted in full revolutions generally about an axis of the threaded stud 60 and, if pivoted to clear the call base (as shown in dashed lines in FIG. 7), be rolled through full rolls about an axis of the axle 84. Consequently, rolling the call actuator a half a turn relative the call base presents the other or the one broad face 44 or 42 for scraping with the rubbing edge.

Unlike the FIGS. 1 through 6 version of the pivot connection, here in FIGS. 7 and 8 the spacing between the call actuator's pivot end 18 and the call base is mechanically set (and without bias from a spring, there being none) by how high up or low down the splice nut 62 is twisted onto the threaded stud 60. Therefore, twisting or untwisting the splice nut 62 provides adjustability over the spacing between the call actuator and call base. This is an alternative way to achieve adjustability over where on the rubbing edge 38's arch that the call actuator is targeted to rub and thus change the key of the sound produced. Again, as between extremes on the arch of closest to the call actuator's pivot end 18 to, in the opposite direction, closest to the call actuator's handle end 16.

Generally, both versions of the turkey call in accordance with the invention allows adjustability over the slant angle of the call actuator, and it is slant angle which determines where on the crest or flanking downslopes of the arched rubbing edges 38 that the call actuator actually scrapes. In FIGS. 7 and 8, this achieved in part by a splice nut 62. However, adjustability in FIGS. 7 and 8 is limited to full (or half) revolutions of the call actuator, whereas in contrast the FIGS. 1 through 6 version fine tuning of adjustability by smoothly continuous tightening or loosening of the pivot bolt 50.

Again, in FIGS. 7 and 8, adjustability over the spacing between the call actuator and call base is limited to set increments. These set increments are determined by the stud 60's and nut 62's thread pitch in conjunction with half revolution pivots of the call actuator (if either broad face 42 or 44 is to be used, or else with full revolution pivots if only a selected one of the broad faces 42, 44 is to be used).

The next matter involves a relatively technical subject known as purfling. Broadly speaking, purfling is a groove in a sound panel, generally but not exclusively bordering an edge. In musical instruments, violins have purfling. Spanish guitars do not.

The inclusion of purfling, and the location where it is put, do change the sound quality of any sound panel. If done right (eg., to the subjective discernment of one party and not necessarily a dissenter), purfling can enhance sound quality.

Purfling can change tone, pitch, even volume (ie., purfling partly explains why diminutive violins are so loud and largish Spanish guitars so relatively soft). What follows is a somewhat involved discourse on maters of pitch and tone.

The term "pitch" in context of acoustics has a highly complicated technical meaning. It is less a measured value than an assigned value based on perception by, needless to say, human listeners. One standard text on the physics of musical acoustics introduces the term this way:

As a matter of fact, it [ie., "pitch"] is an exceedingly difficult word to define properly, although we can settle upon an unambiguous way of using it for present purposes. If we experiment with sequences of continuously repeating impulsive sounds, we find that the pitch we assign to a sufficiently rapid succession of impulses depends almost completely on the repetition rate and hardly at all on the nature of the special sound belonging to each individual impulse that makes up a given repetition series. Let me put this another way. If we conduct an experiment in which the ear is presented first with a tone from one source of repeated impulses and then with a tone from another source, we find that the source having the faster repetition rate of the two will be perceived as having the higher pitch. Furthermore, we normally hear the two pitches as being very nearly equal when the repetition rates are equal.

Arthur H. Benade, Ph.D., "Fundamentals of Musical Acoustics," ($2^d$ revised ed., Dover Pubs., Inc., 1990), p. 14. The meaning of pitch is then explored in at least two different chapters 185 pages apart. Evidently, a musical key can be perceived as corresponding to a pitch of tuning fork vibrating at 440 Hz (eg., $A_4$) and yet comprise a series of sinusoidal components no lower than 880 Hz. Again, the ear "hears" a key corresponding to a 440 Hz tuning fork but the actual sound-producing source is vibrating nowhere near that slow. While it is emanating several different frequencies at once, the lowest frequency can be no lower than 880 Hz, which is twice the "discerned" frequency. See, eg., A. H. Benade, supra, §14.4.D., entitled "The Musical Fifth," pp. 271-74.

Another standard reference defines "pitch" partly as follows.

"The quality of sound that fixes its position in the scale. Sounds produced by such instruments as a cymbal or bass drum are said to be of indefinite pitch. Pitch is determined by what the ear perceives as the most fundamental wave-frequency of a sound . . . "

The Norton/Grove Encyclopedia of Music. Again, pitch is determined by what the ear discerns as the most fundamental wave-frequency of a sound. In the example cited above, regarding "The Musical Fifth," the ear discerns or implies a pitch of the Musical Fifth (eg., implies $A_4$ or 440 Hz) but in fact the tone it is the summation of one fundamental frequency of 880 Hz (and its harmonics) with another fundamental frequency of 1,320 Hz (and its harmonics). Again the ear discerns a single 440 Hz tone which when it in fact is a composite of two much higher frequency tones (ie., in the relationships of 3/2 ratio) and (sone of) their harmonics.

Figure 5:
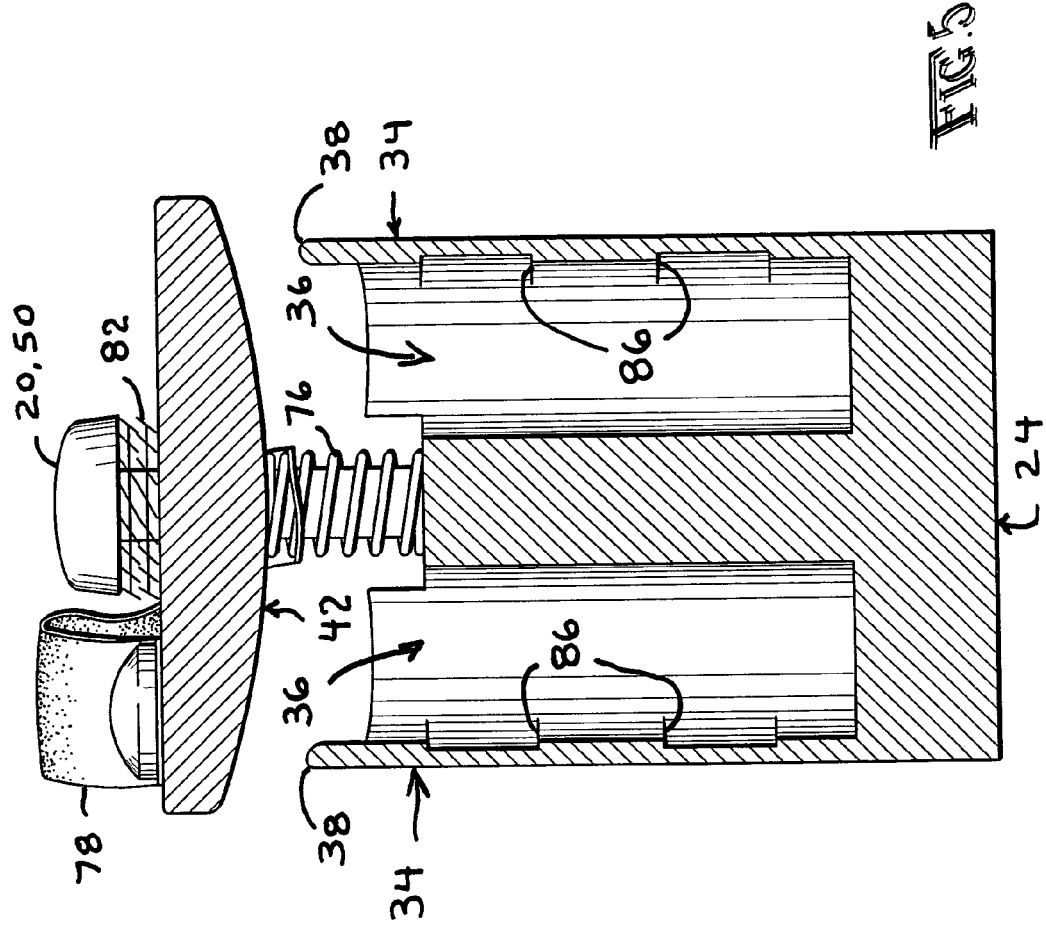
FIG. 5 is an enlarged-scale sectional view taken along line V-V in FIG. 3.
Figure 6:
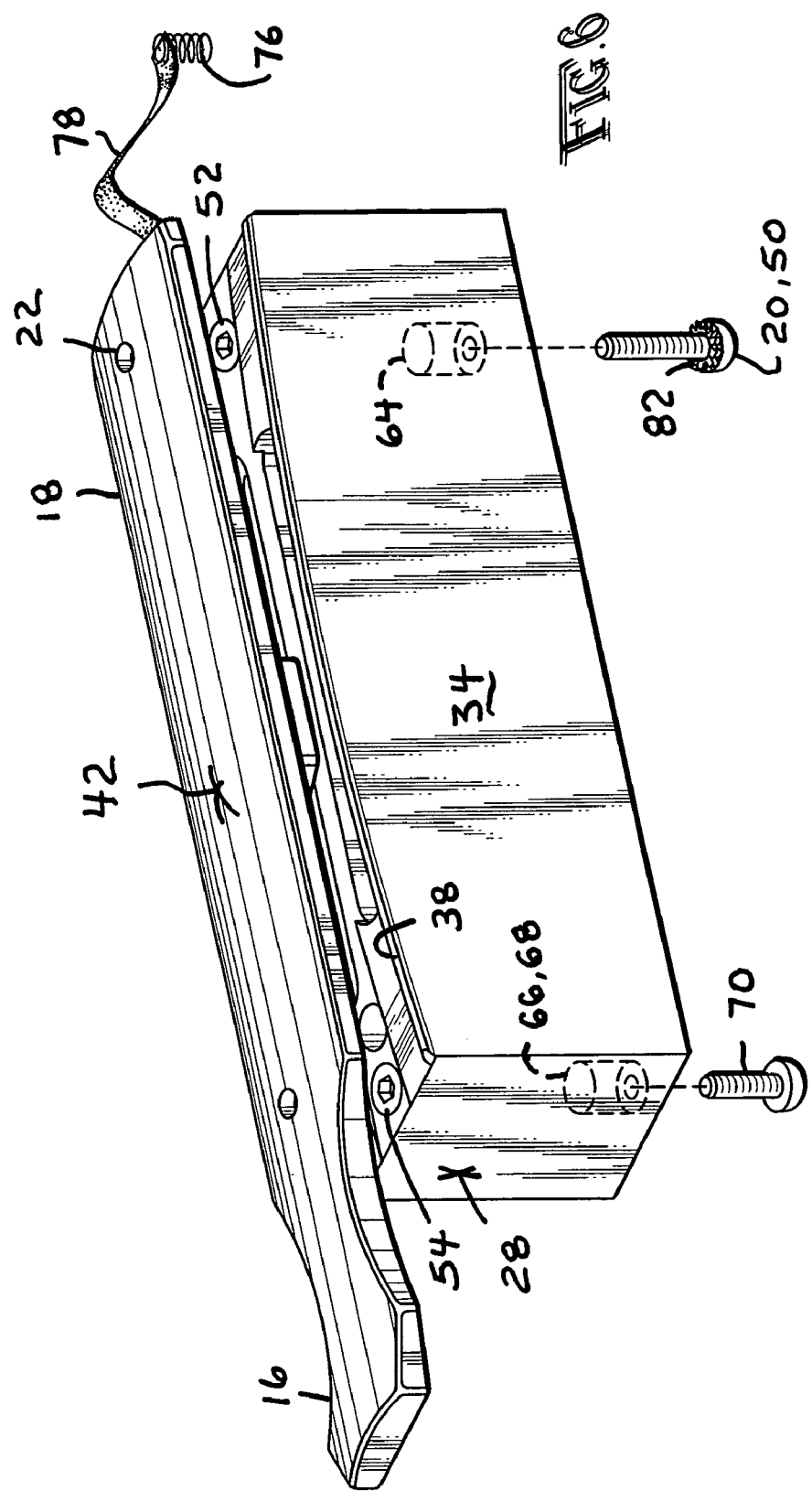
FIG. 6 is a perspective view comparable to FIG. 2 except showing the call actuator rolled over a half of a roll along its long axis in order to allow use of the other broad face of the actuator (which in FIG. 2 is the UP face, but here in FIG. 6 is now the DOWN face)

Accordingly, applicant deepens the "voice" of the call not by enlarging the sound panel 34 but by adding purfling grooves 86 as best shown in FIG. 5. The purfling grooves 86 make changes that if were measured would likely show as producing a series of higher frequency tones. However, the interference of the newly-produced tones if sharing a 3/2 frequency ratio produces the discernment of tone much deeper than any of the actual, higher frequency products.

It is preferred if the inventive purfling 86 is formed in the sound panels 34 from the inside of the sound chamber 36. It is found only necessary or preferred to form the purfling grooves 86 very thin. That is, as FIG. 5 shows, the purfling grooves 86 are square-C shaped in cross-section. The square-C shape is very thin. In other words, height of the vertical span of the square-C shape is substantially greater than the recessed depth thereof.

This patent disclosure incorporates by reference commonly-owned, commonly-invented U.S. Pat. No. 6,149,493 to Kenneth W. Long, as if fully set forth herein by this reference to it.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A turkey call comprising:
   an elongated call base having a bottom wall extending between longitudinally-spaced first and second upwardly-extending end walls, said bottom wall and end walls cooperatively supporting at least one sound panel respectively along a bottom margin thereof as well as along longitudinally-spaced end margins thereof, said at least one sound panel having a longitudinally-elongated upper rubbing edge that has an intermediate crest situated between flanking downslopes;
   an elongated call actuator presenting an elongated pair of spaced broad faces that extend in a lateral direction between diminutive side edges and in a longitudinal direction between a base end and a spaced handle end which is adapted for manipulation by a user;
   a pivot connection between the base end of the call actuator and first end of the call base so that one broad face of the call actuator can be pivoted in sweeping arcs over the sound panel's rubbing edge for sound production of mimic turkey calls;
   wherein the call actuator's base end is formed with a pivot hole passing through both broad faces thereof, and
   the pivot connection further comprises a finger-adjustable, actuator-to-base spacing system, comprising:
      a pivot pin adapted for extension through said pivot hole having threaded portions,
      a stationary provision in the call base's first end for firmly holding the pivot pin in an upright disposition, and
      a threaded fastening component for securing the call actuator pivotally connected to the call base and, in reverse, allowing the call actuator to be disconnected from the call base;
   wherein the threaded fastening component comprises a finger grip-portion that is arranged and sized to allow a user to get a pinch-hold thereon and mechanical advantage thereover for twisting and untwisting operations, whereby the threaded fastening component in combination with the finger-grip portion thereof allows a user not only to dial in a selected spacing between the call base and call actuator but also to do so in the fields and woods and without tools.

2. The turkey call of claim 1 wherein, the pivot pin and threaded fastening component are combined in a pivot bolt, the stationary provision comprises the call base's first end formed with an internally-threaded socket, and, the finger grip-portion comprises an enlarged cap-head for the pivot bolt.

3. The turkey call of claim 1 further comprising:
   a compression spring sized for insertion of the pivot pin therethrough and for applying an expansion force between the call actuator and call base.

4. The turkey call of claim 2 further comprising:
   a compression spring sized for insertion of the pivot pin therethrough and for applying an expansion force between the call actuator and call base; and a star-type lock washer with the bolt inserted therethrough and disposed between the bolt's head and the call actuator in order to promote, in conjunction with the applied expansion force of the compression spring, coupling between the bolt and call actuator thereby pivot in union, wherein the bolt and internally-threaded socket fit closely such that twisting or untwisting the bolt requires overcoming a frictional drag whereby the coupling between the bolt and call actuator transmits the frictional drag to the pivoting of the call actuator and hence reduces the tendency of the pivot bolt to back out (unscrew) during use of the call.

5. The turkey call of claim 2 wherein the stationary provision further comprises a durable nut insert sunk into the call base for receiving the pivot bolt whereby the pivot bolt can be twisted deeper in the nut insert and untwisted back over many times in the life of the turkey call.

6. The turkey call of claim 5 wherein pivot bolt's enlarged cap head has a roughened periphery to enhance grip.

7. The turkey call of claim 6 wherein pivot bolt comprises a plastic-headed metal bolt.

8. A turkey call comprising:
an elongated call base having a bottom wall extending between longitudinally-spaced first and second upwardly-extending end walls, said bottom wall and end walls cooperatively supporting at least one sound panel respectively along a bottom margin thereof as well as along longitudinally-spaced end margins thereof, said at least one sound panel providing an upper rubbing edge;
an elongated call actuator presenting an elongated pair of spaced broad faces that extend in a lateral direction between diminutive side edges and in a longitudinal direction between a base end and a spaced handle end which is adapted for manipulation by a user;
a pivot connection between the base end of the call actuator and first end of the call base so that one broad face of the call actuator can be pivoted in sweeping arcs over the sound panel's rubbing edge for sound production of mimic turkey calls; and
a locking bolt, wherein the call base is formed with a threaded socket in the second end thereof and the call actuator's handle end is formed with a locking hole passing through both broad faces thereof such that the locking bolt can be inserted through the locking hole and tightened in the socket in order to lock the call actuator to the call base during non-use and thereby to silence the call as well as avoid unwanted sound production during transport.

9. The turkey call of claim 8 wherein the pivot connection comprises a threaded stud and a nut.

10. The turkey call of claim 8 wherein the pivot connection comprises a fastener in the call base's first end.

11. The turkey call of claim 8 wherein the call base's bottom wall is formed with a reserve threaded socket for temporary storage of the locking bolt when the call actuator is unlocked from the call base in order to provide storage for and reduce chances of mishandling as well as loss of the locking bolt.

12. A turkey call comprising:
an elongated call base having a bottom wall extending between longitudinally-spaced first and second upwardly-extending end walls, said bottom wall and end walls cooperatively supporting a first and second sound panel in laterally spaced relation with one another by virtue of supporting said sound panels respectively along a bottom margin for each as well as along longitudinally-spaced end margins of each, wherein each sound panel provides an upper rubbing edge;
wherein the call base is formed with an internally-threaded socket in the first end thereof and aligned on a generally vertical axis;
an elongated call actuator presenting an elongated pair of spaced broad faces that extend in a lateral direction between diminutive side edges and in a longitudinal direction between a base end and a spaced handle end which is adapted for manipulation by a user;
wherein the call actuator's base end is formed with a pivot hole passing through both broad faces thereof; and
a pivot bolt insertable through the pivot hole in the call actuator's base end and receivable by the call base's internally-threaded socket in the first end thereof for forming a pivot connection between the base end of the call actuator and first end of the call base so that one broad face of the call actuator can be pivoted in sweeping arcs over either the first or the second sound panels' rubbing edges for sound production of mimic turkey calls;
wherein the call base is formed with another internally-threaded socket in the second end and aligned on an axis generally parallel to that of the one socket in the first end thereof such that the pivot bolt can be taken apart from call base's first end, and then the call actuator's base end can be swung about and reattached to the call base's second end by the pivot bolt twisted into the other internally-threaded socket so that the call actuator can be pivoted from the call base's second end for sound production of mimic turkey calls whereby this allows a user regardless of whether left-handed or right-handed to orient the call actuator for a mode of orientation on either rubbing edge which best suits that user.

13. The turkey call of claim 12 wherein the call base's bottom wall is formed with a reserve internally-threaded socket for temporary storage of the pivot bolt when disconnecting the call actuator from the call base in order to provide storage for and reduce chances of mishandling as well as loss of the pivot bolt.

14. The turkey call of claim 13 wherein the reserve internally-threaded socket and one or the other of the internally-threaded sockets for connection of the call actuator thereto are formed along a common vertical axis through the call base.

15. The turkey call of claim 12 further comprising:
a locking bolt, wherein the call actuator's handle end is formed with a locking hole passing through both broad faces thereof such that the locking bolt can be inserted through the locking hole and tightened in the internally-threaded socket of the call base's end opposite to the end in which the pivot bolt is fastened, and in order to lock the call actuator to the call base during non-use and thereby to silence the call as well as avoid unwanted sound production during transport.

16. The turkey call of claim 15 wherein the call base's bottom wall is formed with a reserve internally-threaded socket for temporary storage of the locking bolt when the call actuator is unlocked from the call base in order to provide storage for and reduce chances of mishandling as well as loss of the locking bolt.

17. A turkey call comprising:
an elongated call base having a bottom wall extending between longitudinally-spaced first and second upwardly-extending end walls, said bottom wall and end walls cooperatively supporting at least one sound panel respectively along a bottom margin thereof as well as along longitudinally-spaced end margins thereof, said at least one sound panel providing an upper rubbing edge;

an elongated call actuator presenting an elongated pair of spaced broad faces that extend in a lateral direction between diminutive side edges and in a longitudinal direction between a base end and a spaced handle end which is adapted for manipulation by a user; and a pivoting and rolling mechanism between the base end of the call actuator and first end of the call base so that one broad face of the call actuator can be pivoted in sweeping arcs over the sound panel's rubbing edge for sound production of mimic turkey calls;

wherein said pivoting and rolling mechanism comprises:
  an upright threaded stud anchored in the call base's first end,
  an elongated nut twisted part way onto the threaded stud, and
  an elongated axle coupled to and projected to trail from call actuator's base end,
  wherein the call actuator can pivot full revolutions generally about an axis of the threaded stud and, if pivoted to clear the call base, roll full rolls about an axis of the axle, whereby rolling the call actuator a half a turn relative the call base presents the other broad face for scraping with the rubbing edge; and,
wherein said adjustability over the spacing is limited to set increments and as determined by the stud's and nut's thread pitch in conjunction with half revolution pivots of the call actuator if either broad face is to be used, or else with full revolution pivots if only a selected one of the broad faces is to be used.

18. A turkey call comprising:

an elongated call base having a bottom wall extending between longitudinally-spaced first and second upwardly-extending end walls, said bottom wall and end walls cooperatively supporting at least one sound panel respectively along a bottom margin thereof as well as along longitudinally-spaced end margins thereof, said at least one sound panel providing an upper rubbing edge;

an elongated call actuator presenting an elongated pair of spaced broad faces that extend in a lateral direction between diminutive side edges and in a longitudinal direction between a base end and a spaced handle end which is adapted for manipulation by a user;

a pivot connection between the base end of the call actuator and first end of the call base so that one broad face of the call actuator can be pivoted in sweeping arcs over the sound panel's rubbing edge for sound production of mimic turkey calls;

said call base's bottom wall and end walls cooperatively support another sound panel respectively along a bottom margin thereof as well as along longitudinally-spaced end margins thereof, and in a laterally spaced relation with said one sound panel such that the call base defines an open-topped sound chamber; and wherein said one or the other sound panel is formed with a purfling groove along the upper rubbing edge thereof that is recessed into said one or the other panel from within the sound chamber.

19. The turkey call of claim 18 wherein:

the purfling groove has a square-C shape in cross-section and the height of the vertical span thereof is substantially greater than the recessed depth thereof.

* * * * *